United States Patent
Ruhlander et al.

(10) Patent No.: US 8,418,580 B2
(45) Date of Patent: Apr. 16, 2013

(54) CABLE ASSEMBLY

(75) Inventors: Gregory Phillip Ruhlander, Hannibal, MO (US); Donald Gene Gordy, Moberly, MO (US); David A. Choby, Rochester Hills, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 1260 days.

(21) Appl. No.: 11/938,400

(22) Filed: Nov. 12, 2007

(65) Prior Publication Data

US 2009/0120231 A1  May 14, 2009

(51) Int. Cl.
*F16C 1/10* (2006.01)
*F16C 1/22* (2006.01)
*F16C 1/26* (2006.01)

(52) U.S. Cl.
USPC ........ 74/502.4; 74/502.6; 74/500.5; 403/195; 403/197

(58) Field of Classification Search ...... 74/502.4–502.6, 74/500.5; 403/195–197; 24/586.11; 174/77 R; 248/56; 285/24; F16C 1/26; F16H 61/36; F16B 9/02
See application file for complete search history.

(56) References Cited

U.S. PATENT DOCUMENTS

| | | | |
|---|---|---|---|
| 2,730,134 A | 1/1956 | Morse | |
| 3,366,356 A * | 1/1968 | Fisher | 248/56 |
| 4,088,156 A * | 5/1978 | Kubo et al. | 138/109 |
| 4,967,987 A | 11/1990 | Swank | |
| 5,337,621 A * | 8/1994 | Spease | 74/502.4 |
| 5,683,117 A * | 11/1997 | Corbett et al. | 285/24 |
| 5,862,710 A | 1/1999 | Koenig | |
| 5,911,790 A * | 6/1999 | Bates et al. | 74/502.4 |
| 6,658,706 B2 | 12/2003 | Scheidling et al. | |
| 7,029,194 B2 * | 4/2006 | Ishikawa et al. | 403/195 |
| 7,530,288 B2 * | 5/2009 | Ruhlander | 74/502.4 |
| 8,082,820 B2 * | 12/2011 | Schulz | 74/502.4 |
| 2004/0129105 A1 | 7/2004 | Gordy et al. | |
| 2004/0149480 A1 * | 8/2004 | Ball | 174/77 R |
| 2005/0178103 A1 | 8/2005 | Black, III | |
| 2005/0186024 A1 | 8/2005 | Ruhlander | |
| 2006/0110217 A1 | 5/2006 | Foster et al. | |
| 2011/0252917 A1 * | 10/2011 | Do?a Contero et al. | 74/502.4 |

FOREIGN PATENT DOCUMENTS

| | | | |
|---|---|---|---|
| DE | 20 2007 003 950 U1 * | 8/2007 | |
| EP | 0 313 416 A2 * | 4/1989 | |
| EP | 0 764 753 A1 * | 3/1997 | |
| EP | 1 074 752 A1 * | 2/2001 | |
| EP | 1291536 A1 * | 9/2001 | |
| FR | 2865014 * | 7/2005 | |
| JP | 60-107615 * | 7/1985 | |
| WO | WO 2004/070236 | 8/2004 | |

* cited by examiner

*Primary Examiner* — Vinh Luong
(74) *Attorney, Agent, or Firm* — Porter, Wright, Morris & Arthur LLP; Richard M. Mescher; Dean B. Watson

(57) ABSTRACT

A cable assembly includes a mount and an anchor. The mount may include a bracket having an edge, a slot formed in the bracket and extending from the edge, and a recess extending at least partially around the slot. The anchor may be an end fitting that includes an adjuster body having a flange, a slide collar movable toward and away from the flange, and a spring member biasing the slide collar toward the flange. The adjuster body may extend through the slot with the flange and the slide collar on opposed sides. The spring member may bias the slide collar into the recess to form an interlock between the end fitting and the bracket that resists removal of the end fitting from the slot. A preferred end fitting has a drop in swivel tube and an internal isolator that completely isolates a conduit sleeve.

16 Claims, 16 Drawing Sheets

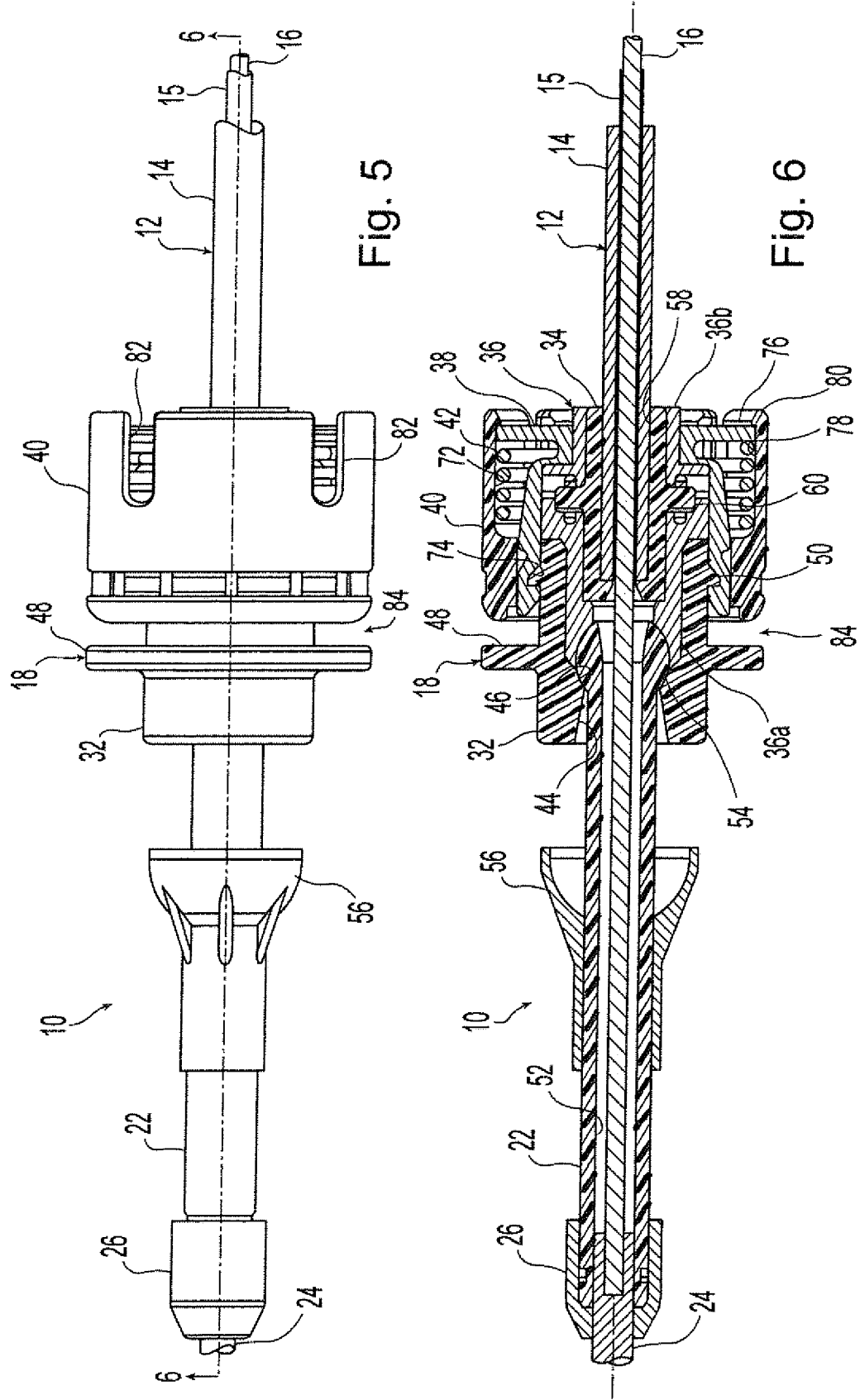

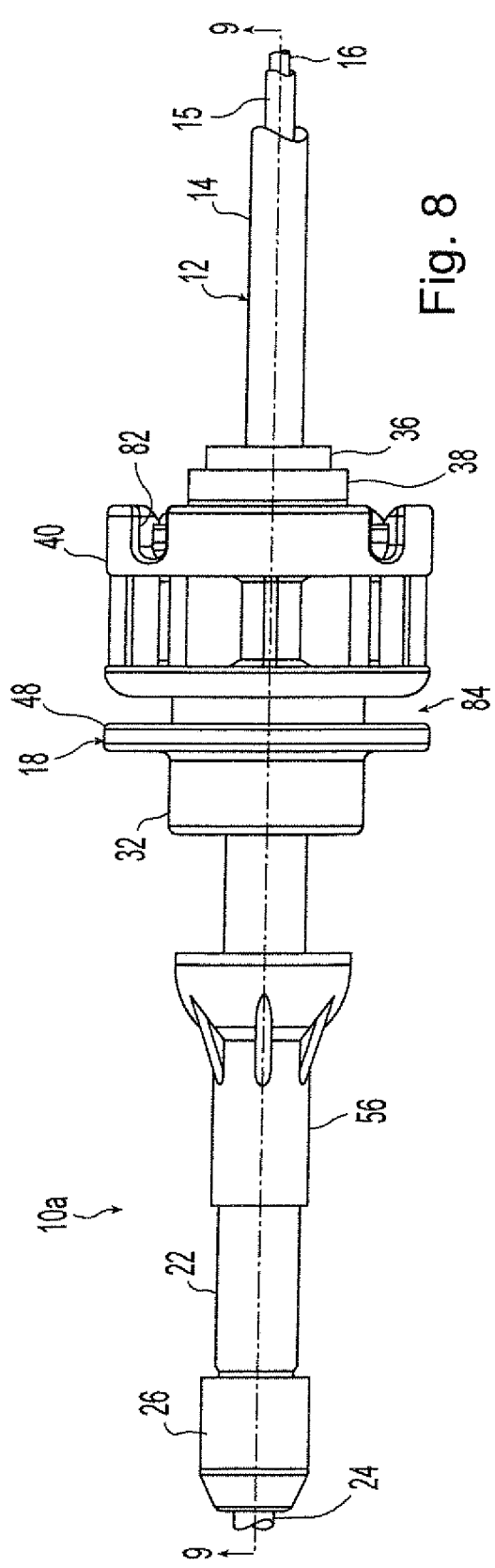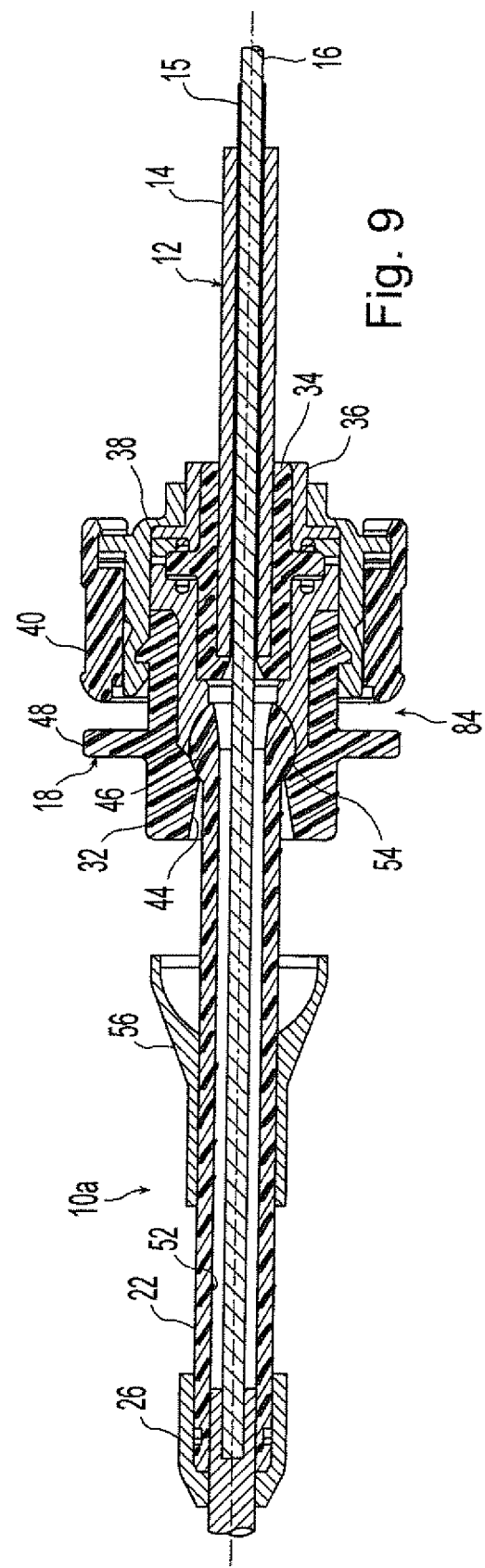

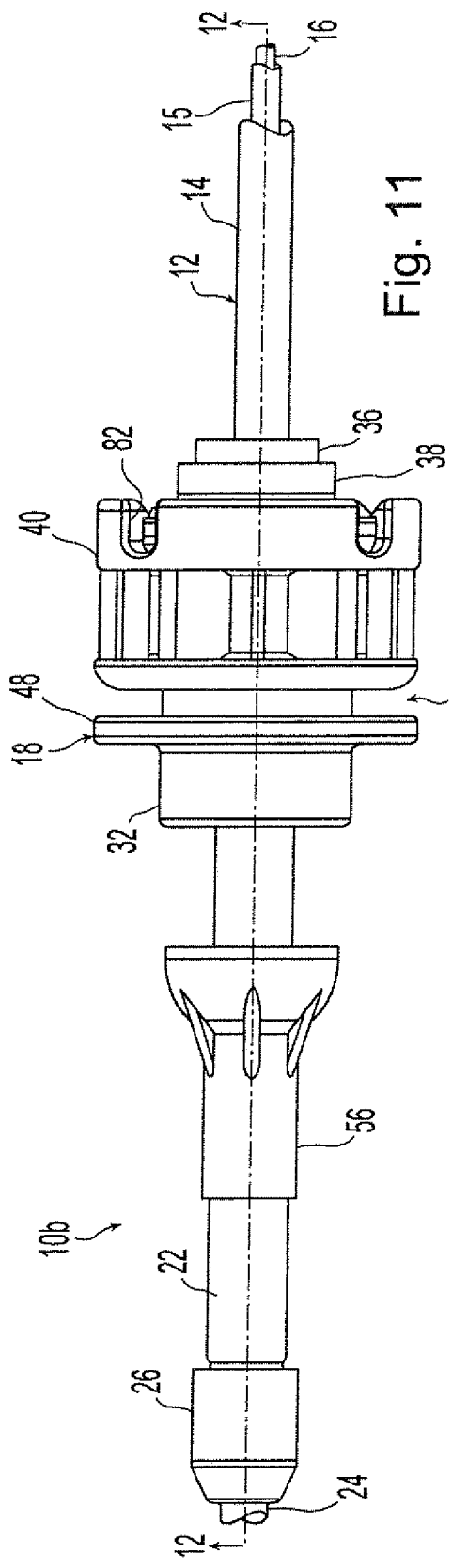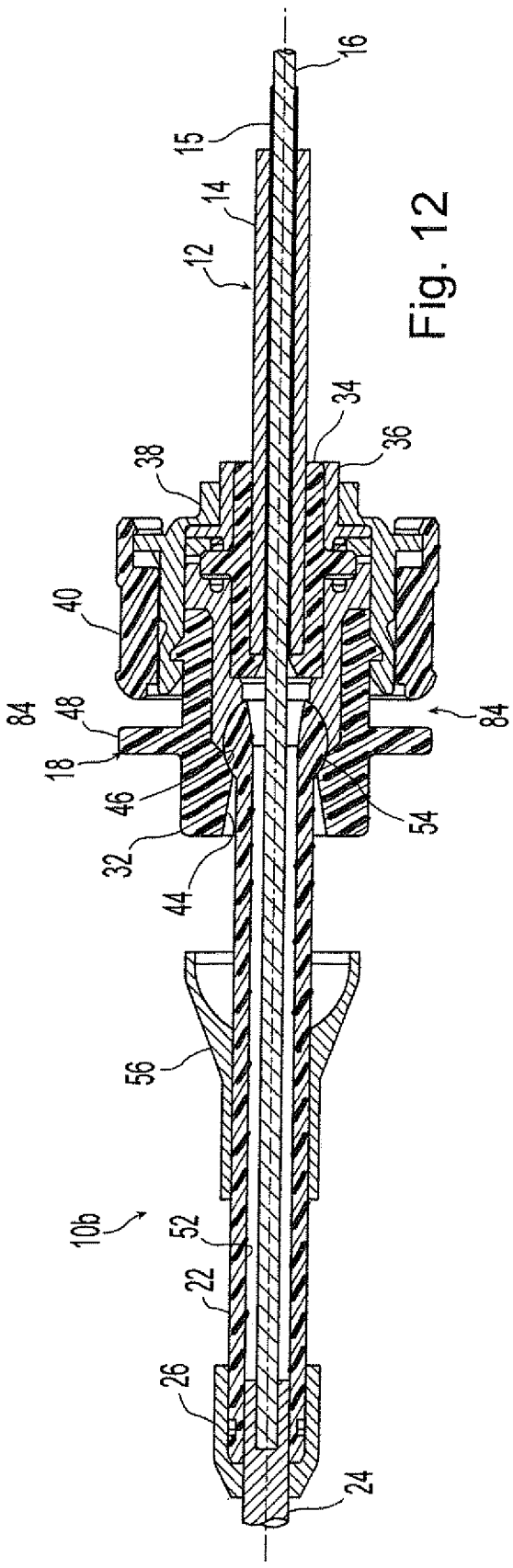

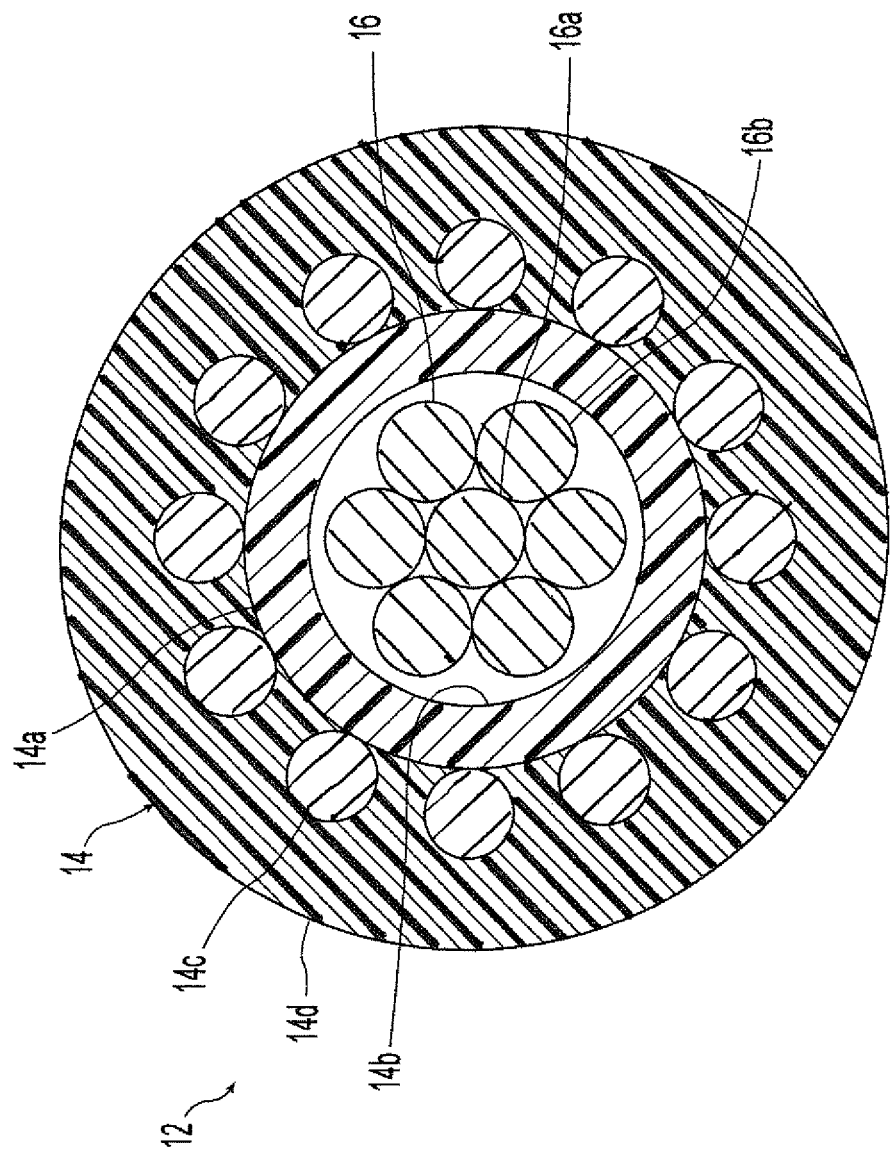

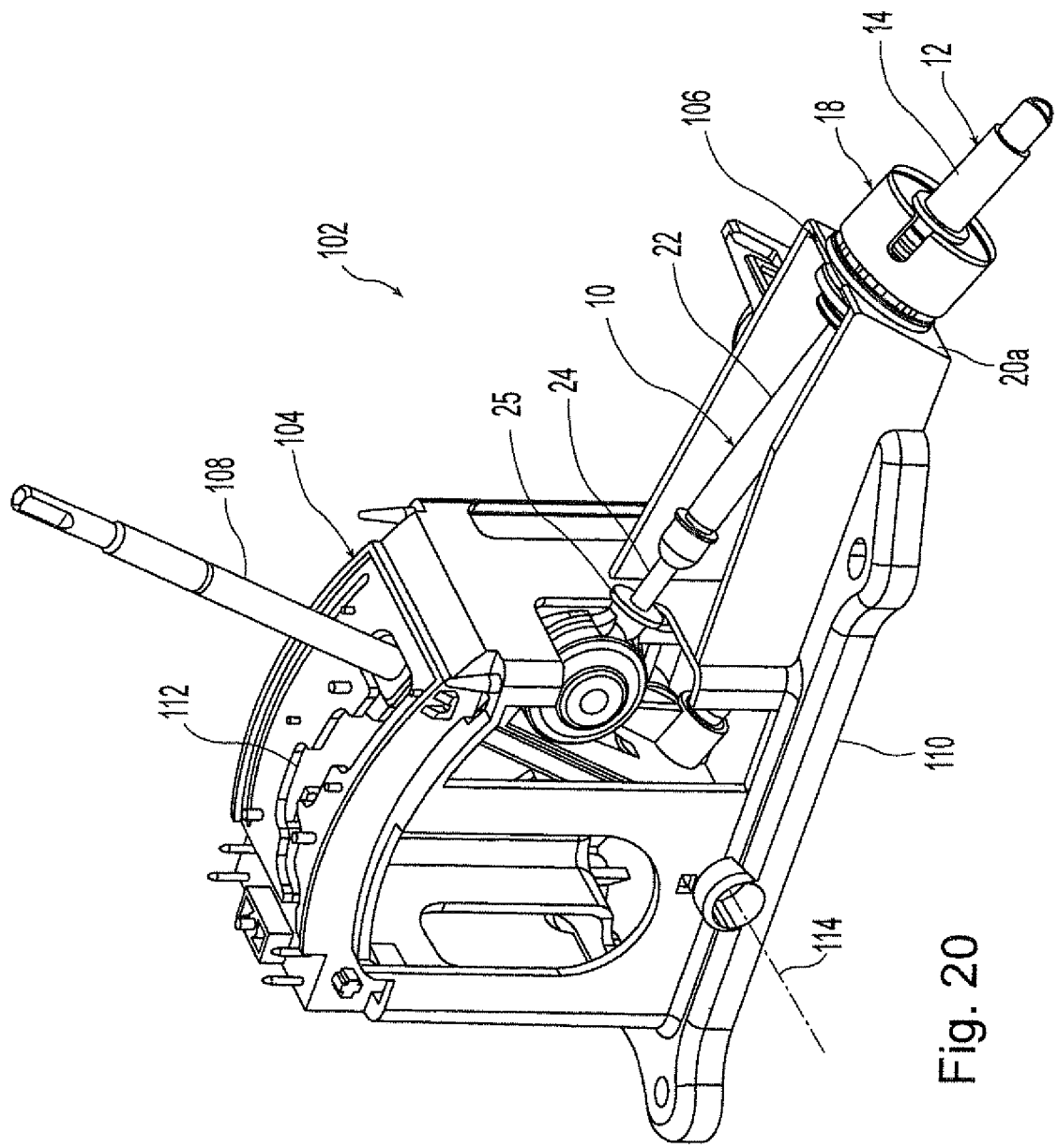

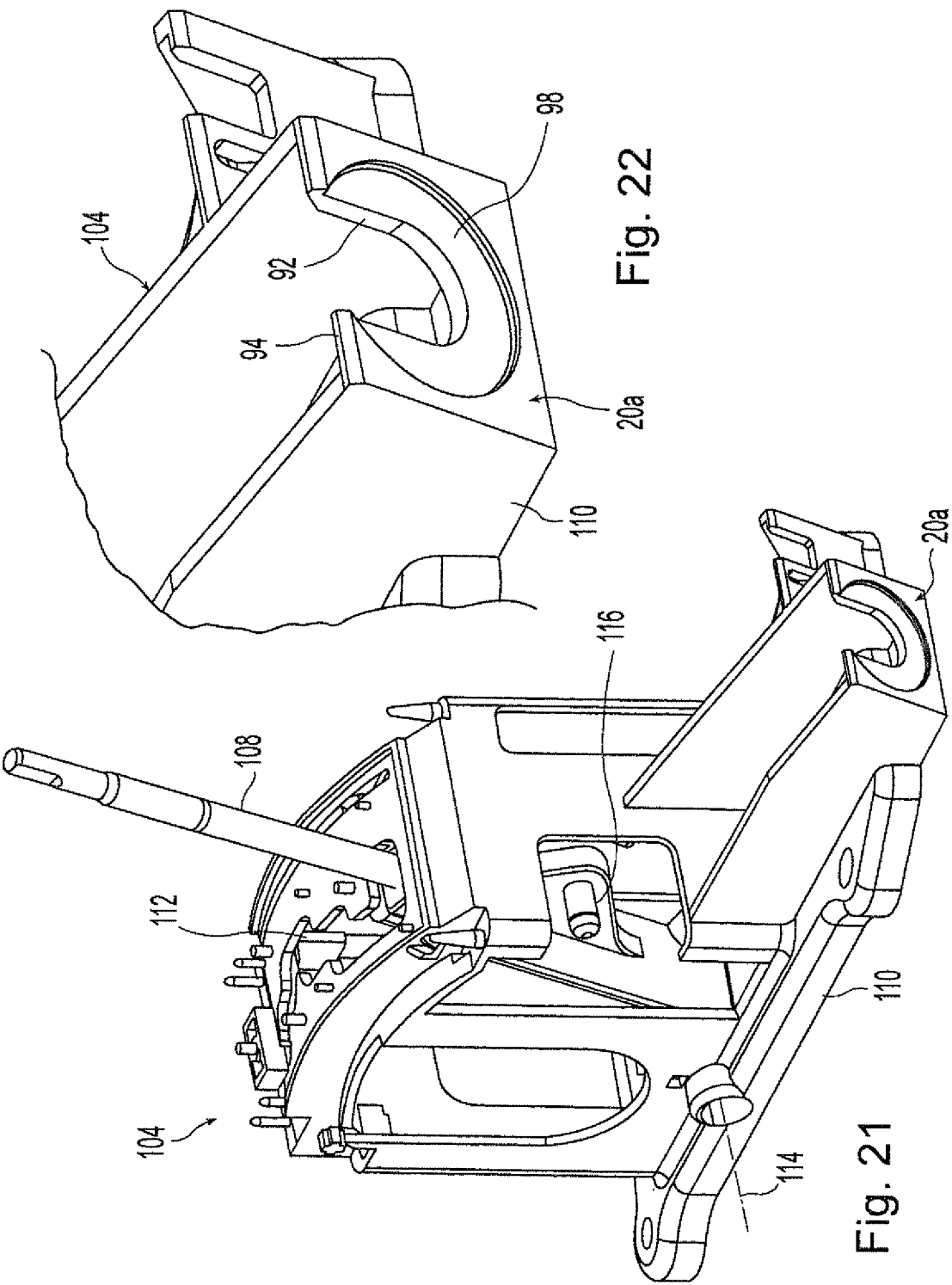

CABLE ASSEMBLY

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the invention generally relates to shifter cables.

BACKGROUND OF THE INVENTION

Motion-transmitting remote control cable assemblies, sometimes referred to as "Bowden cables" or "push-pull cables," are used for transmitting both force and travel along a path. Use of such cable assemblies can be found in aircraft, automotive, and marine environments. These cable assemblies can be used for transmitting force and motion in push/pull type applications. One example of a specific use of such remote control cable assemblies is changing gears of a transmission in automobiles.

A motion-transmitting remote control cable assembly typically includes a flexible core element slidably enclosed within a flexible outer sheath. The core element may be adapted at one end to be attached to a member to be controlled whereas the other end may be attached to an actuator for longitudinally moving the core element within the outer sheath. The outer sheath is secured by some type of anchor, such as by coupling end fittings to support structures, brackets, or abutment members.

In the automobile industry, there is a never ending desire to simplify and/or speed up the assembly process while maintaining vigorous performance requirements and improving reliability, see, for example, European Patent Number EP 1 026 411 and U.S. Pat. No. 6,658,706, the disclosures of which are expressly incorporated herein in their entireties by reference. These cable assemblies have become prevailing standard in Europe. However, these cables must be manufactured to very close tolerances to meet performance requirements. Accordingly, there is a need in the art for an improved remote control cable assembly where manufacturing variation would have less impact on the product or the cable type can be changed to reduce the material required for robust performance.

SUMMARY OF THE INVENTION

Disclosed herein is a cable assembly having an anchor which is positionally insensitive and which addresses one or more issues in the related art. According to one embodiment there is disclosed herein a shifter assembly and shifter cable system comprising, in combination, a transmission shifter assembly, a cable assembly comprising a conduit, a core disposed in the conduit, and a quick connect coupler connected to the conduit, and a retention mount encompassing an outer portion of the coupler when connected to fix the location of the conduit relative to the shifter assembly at a coupler/retention mount interface. The coupler/retention mount interface is insensitive to the rotational position of the coupler. The retention mount may be a bracket connected to the shifter assembly.

According to yet another embodiment there is disclosed herein a cable assembly comprising, in combination, a mount and an end fitting. The mount comprises a plate having an edge, a slot formed in the plate and extending from the edge, and a recess extending at least partially around the slot. The end fitting comprises an end fitting having a flange, a slide collar movable toward and away from the flange, and a spring member biasing the slide collar toward the flange. The end fitting extends through the slot with the flange and the slide collar on opposed sides. The spring member biases the slide collar into the recess to form an interlock between the end fitting and the mount that resists removal of the end fitting from the slot.

According to another embodiment there is disclosed herein a motion transmitting cable assembly comprising, in combination, a cable having a conduit and a core movable within the conduit, an end fitting having a flange. The end fitting forms at least a portion of a socket and a drop-in swivel tube has a ball portion within the socket to form a ball socket joint such that the swivel tube is pivotable relative to the end fitting. A conduit sleeve is securable to the conduit and a retainer is secured to the end fitting and securing the conduit sleeve to the end fitting. The retainer retains the swivel tube in the socket. A slide collar is movable toward and away from the flange and a spring member biases the slide collar toward the flange.

According to yet another embodiment there is disclosed herein a motion transmitting cable assembly comprising, in combination, cable having a conduit and a core movable within the conduit and an end fitting having a flange. The end fitting forms at least a portion of a socket and a swivel tube has a ball portion within the socket to form a ball socket joint such that the swivel tube is pivotable relative to the end fitting. A conduit sleeve is securable to the conduit and a retainer is secured to the end fitting and securing the conduit sleeve to the end fitting. An isolator is separating the end fitting and the retainer from the conduit sleeve. The isolator partially forms the socket and separates the swivel tube from the conduit sleeve. A slide collar is movable toward and away from the flange and a spring member biases the slide collar toward the flange.

In any embodiment disclosed herein in whole or in part, there is preferably provided a connector that engages the retention mount with an insertion force of 50 N or less. Furthermore, in any embodiment into which the coupler fits, the coupler is preferably retained with a pull-off force of 250 N or greater. Such requirements can be accomplished by modification of various elements, such as altering spring force, shape and/or fit of the connector and the shape of the retention mount.

From the foregoing disclosure and the following more detailed description of various preferred embodiments it will be apparent to those skilled in the art that the present invention provides a significant advance in the technology of remote-control cable assemblies. Particularly, the invention(s) disclosed herein provides an easily assembled and disassembled, cable system with relatively high pull out loads and relatively low vibrations transmitted therethrough. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 5 is a side elevational view of the end fitting of FIGS. 1 to 4;

FIG. 6 is a cross-sectional view taken along line 6-6 of FIG. 5;

FIG. 8 is a side elevational view of the end fitting of FIG. 7;

FIG. 9 is a cross-sectional view taken along line 9-9 of FIG. 8;

FIG. 11 is a side elevational view of the end fitting of FIG. 10;

FIG. 12 is a cross-sectional view taken along line 12-12 of FIG. 11;

FIG. 19 is a cross-sectional view a cable of the cable assembly of FIGS. 1 and 2;

FIG. 20 is perspective view of a transmission shifter assembly and cable assembly according to a preferred embodiment of the present invention;

FIG. 21 is a perspective view of the transmission shifter assembly of FIG. 20 wherein the cable assembly is removed for clarity; and FIG. 22 is a is and enlarged, fragmented perspective view of a mount of the transmission shifter assembly of FIG. 21.

Figure 13:
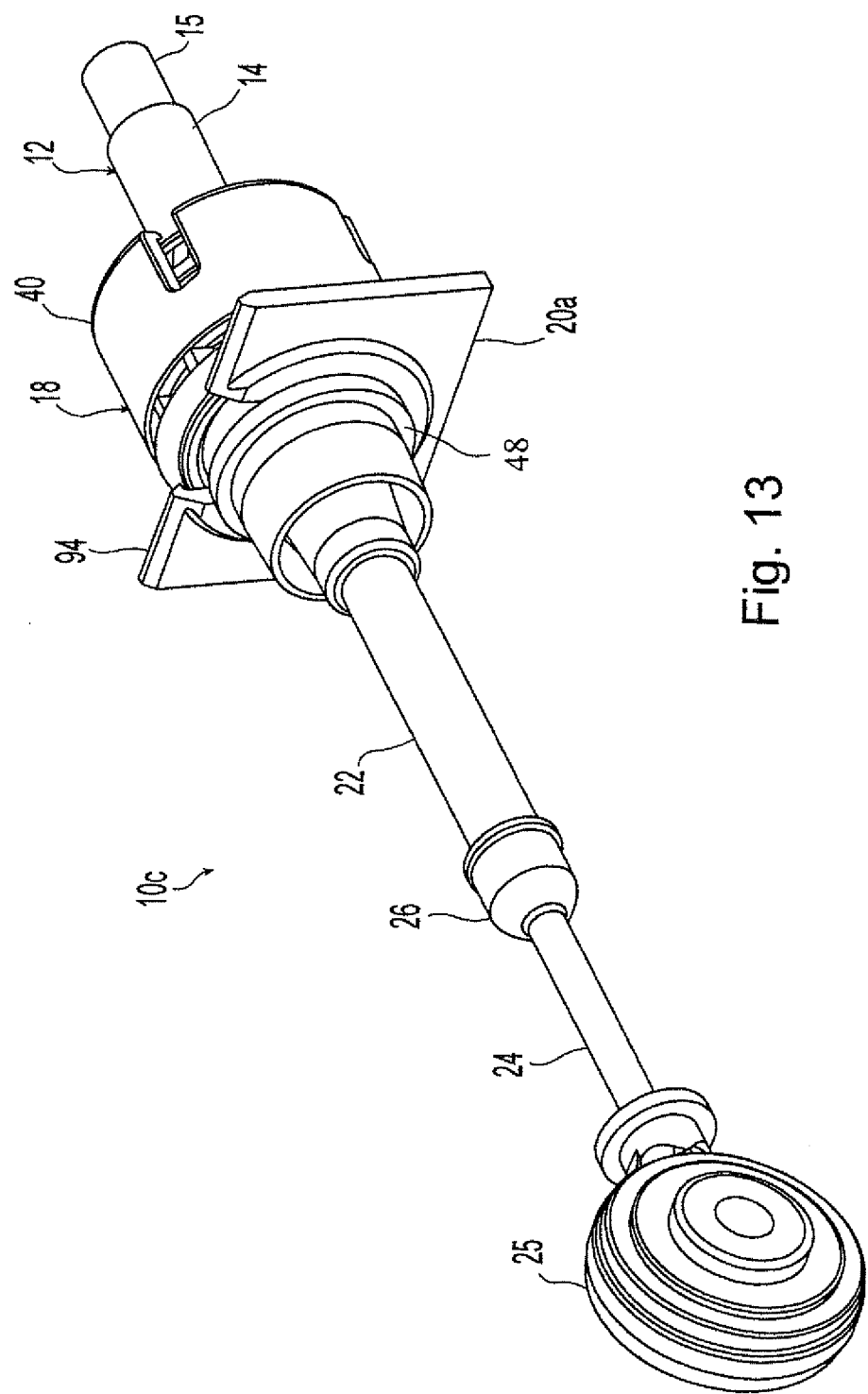
FIG. 13 is a perspective view of a cable assembly according an alternative preferred embodiment of the present invention which is mounted in a vehicle.
Figure 14:
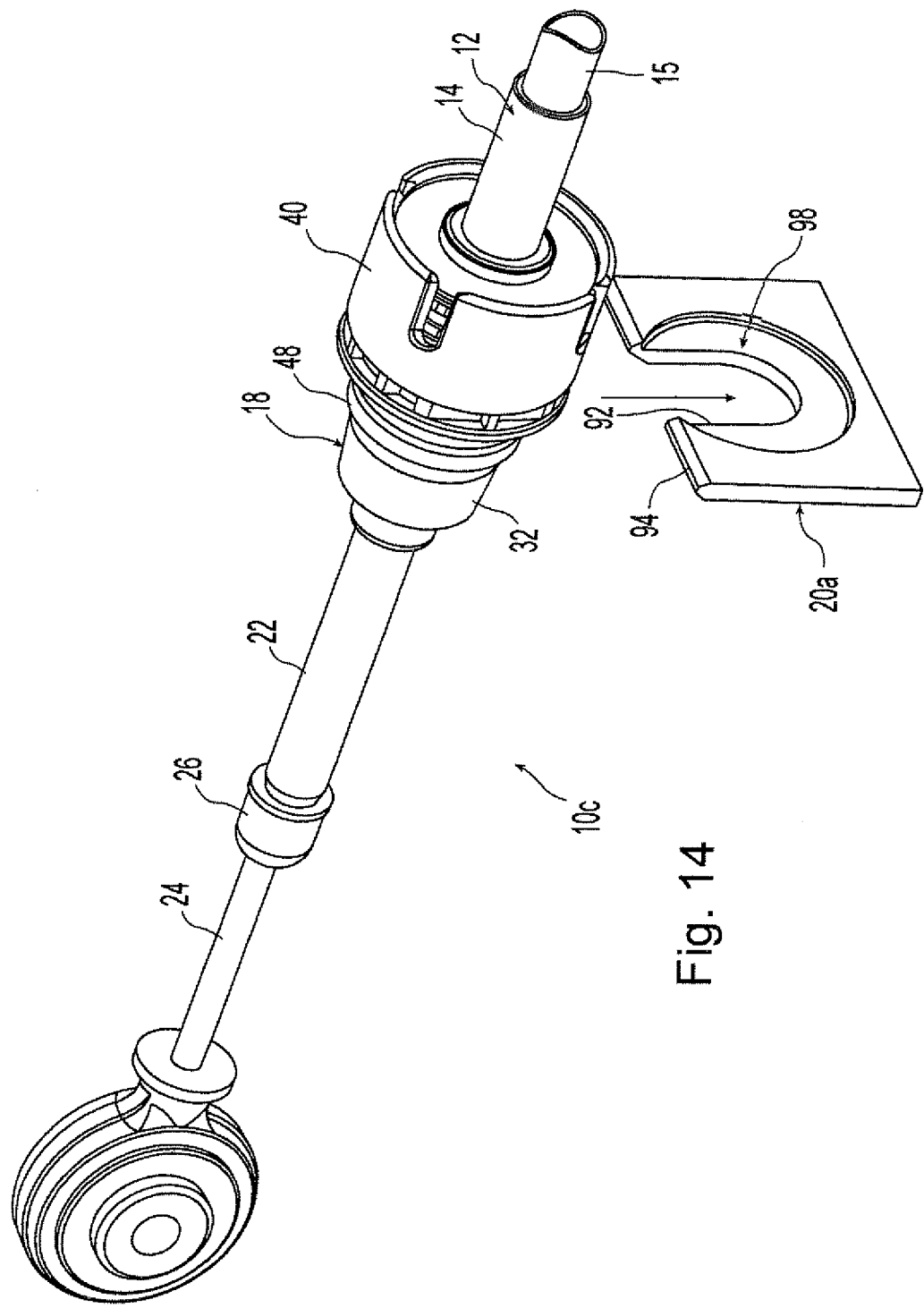
FIG. 14 is a perspective view of an end fitting of the cable assembly of FIG. 13 about to be inserted into a retention mount.
Figure 16:
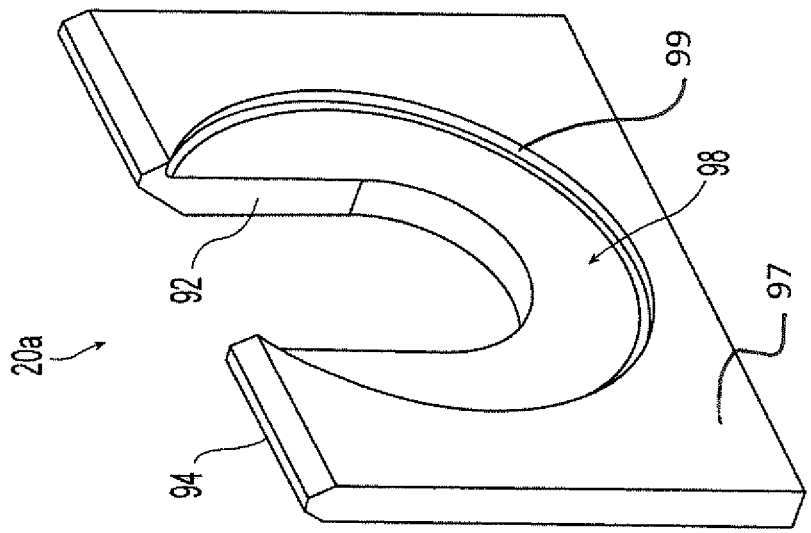
FIG. 16 is a rear perspective view of the mount of FIG. 15.
Figure 15:
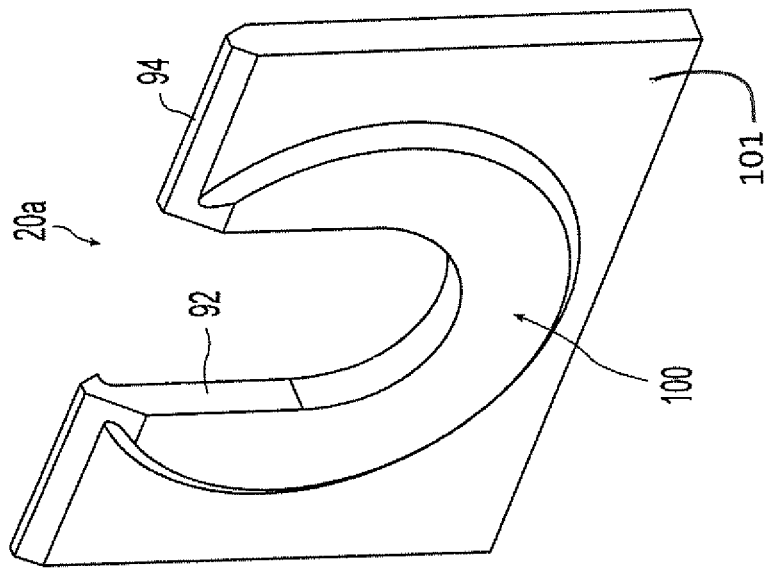
FIG. 15 is a front perspective view of the mount of the cable assembly of FIGS. 13 and 14.
Figure 17:
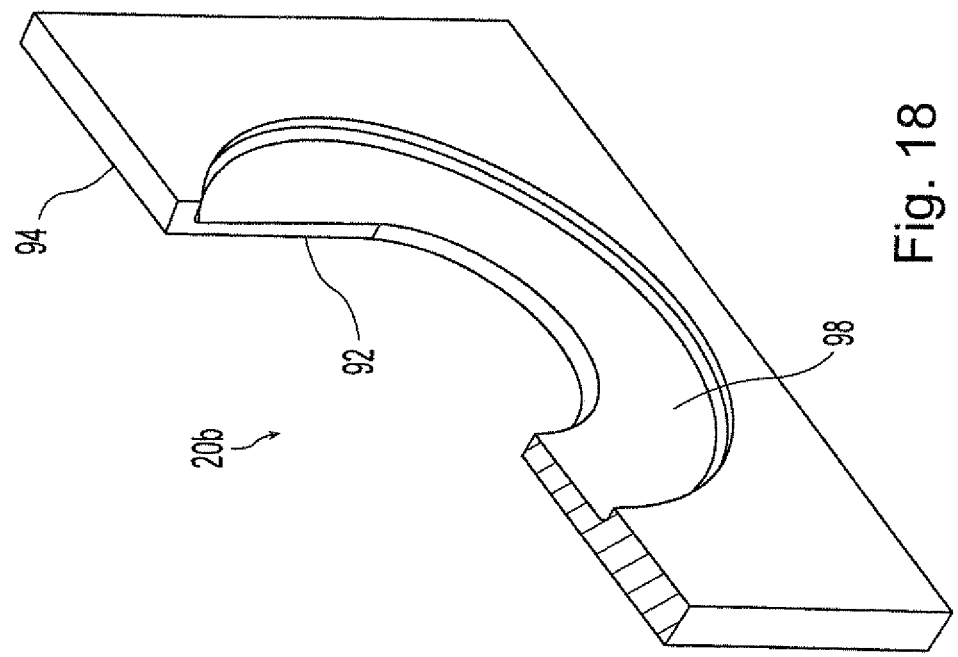
FIG. 17 a rear perspective view of the mount similar to FIG. 16 but partially in cross-section.

It should be understood that the appended drawings are not necessarily to scale, presenting a somewhat simplified representation of various preferred features illustrative of the basic principles of the invention. The specific design features of the quick connecting device as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the remote control cable assemblies illustrated in the drawings. In general, up or upward refers to an upward direction generally in the plane of the paper in FIG. 1 and down or downward refers to a downward direction generally in the plane of the paper in FIG. 1. Also in general, fore or forward refers to a direction generally toward the left in the plane of the paper in FIGS. 1 and 13, that is toward the end of the cable core, and aft or rearward refers to a direction generally toward the right in the plane of the paper in FIGS. 1 and 13, that is away from the end of the cable core.

DETAILED DESCRIPTION OF CERTAIN PREFERRED EMBODIMENTS

The following detailed discussion of various alternative and preferred embodiments will illustrate the general principles of the invention with reference to motion control devices for use with a motor vehicle transmission system. Other embodiments suitable for other motion control devices will be apparent to those skilled in the art given the benefit of this disclosure.

The term "snap-fit" or "snap-lock" is used herein and in the claims to mean a connection between at least two components wherein at least one of the components has a protrusion and/or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together to thereby give a positive feedback to the operator during coupling. The term "unitary" is used herein and in the claims to mean a member made of a single continuous material, such as, for example a molded component. The term "integral" is used herein and in the claims to mean two or more members that are secured together such as, for example, two members connected by over-molding. The term "positionally insensitive" is sued herein and in the claims to mean the cable can be anchored at any rotational position over a 360 degree circumference.

Figure 1:
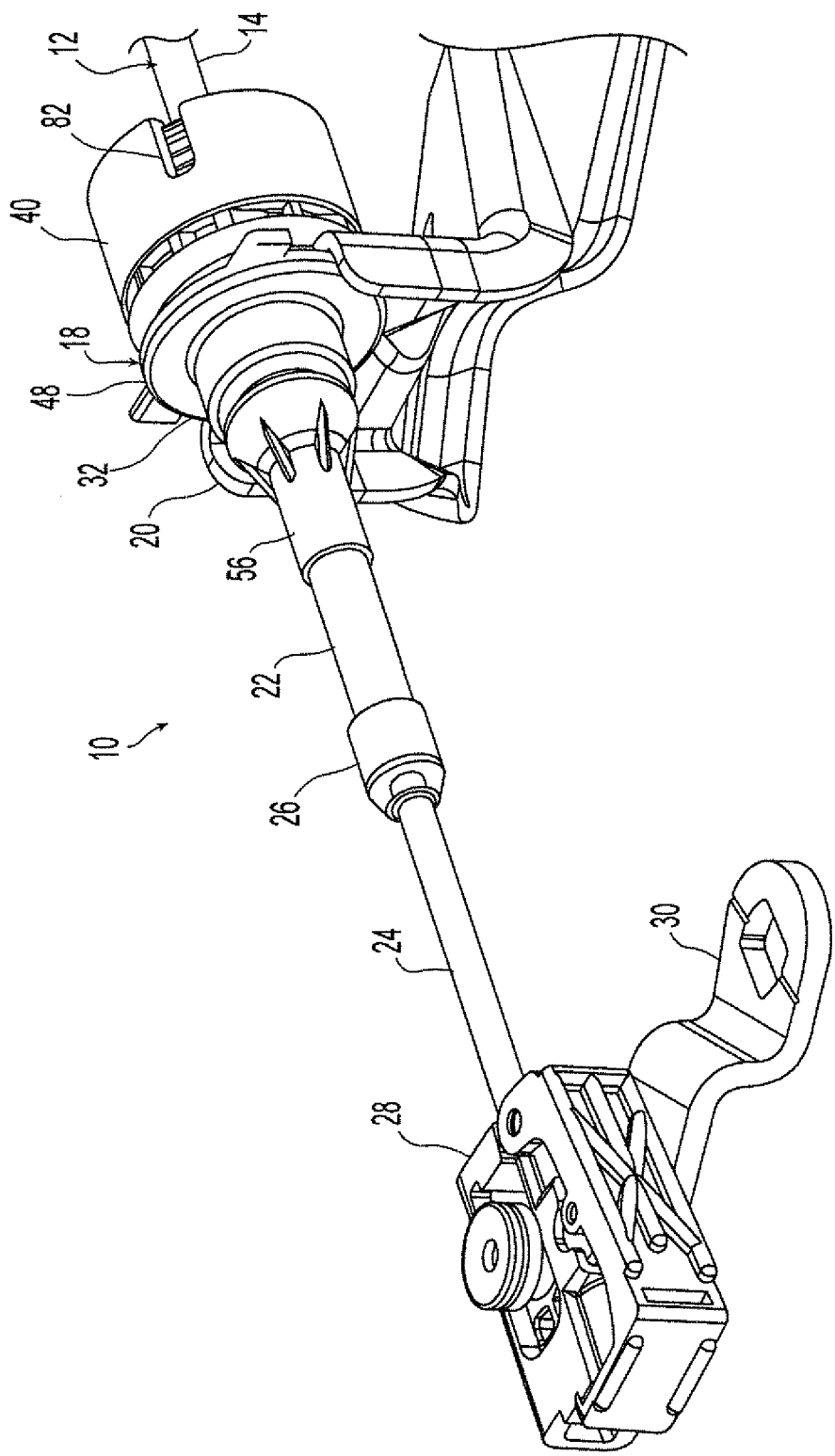
FIG. 1 is a perspective view of a cable assembly according a preferred embodiment of the present invention which is mounted in a vehicle.
Figure 2:
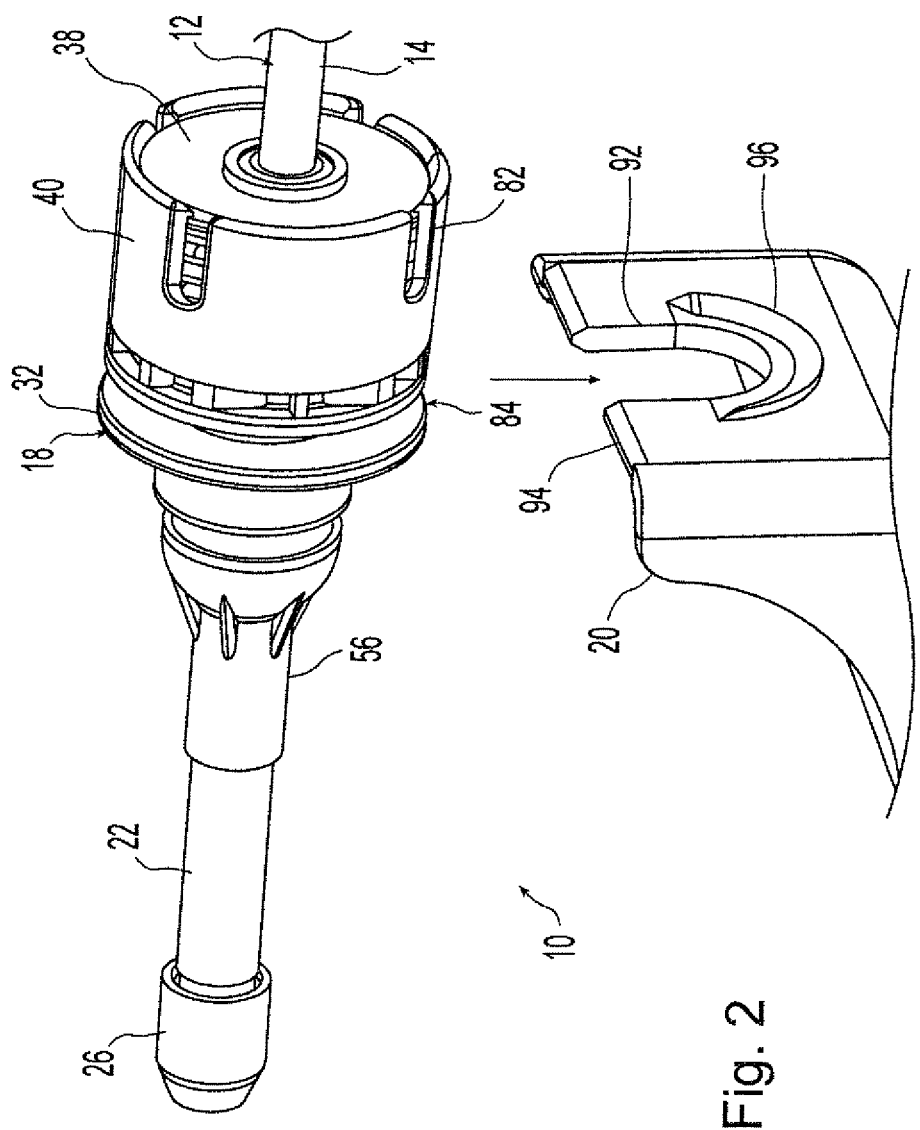
FIG. 2 is a perspective view of an end fitting of the cable assembly of FIG. 1 about to be inserted into a retention mount.
Figure 3:
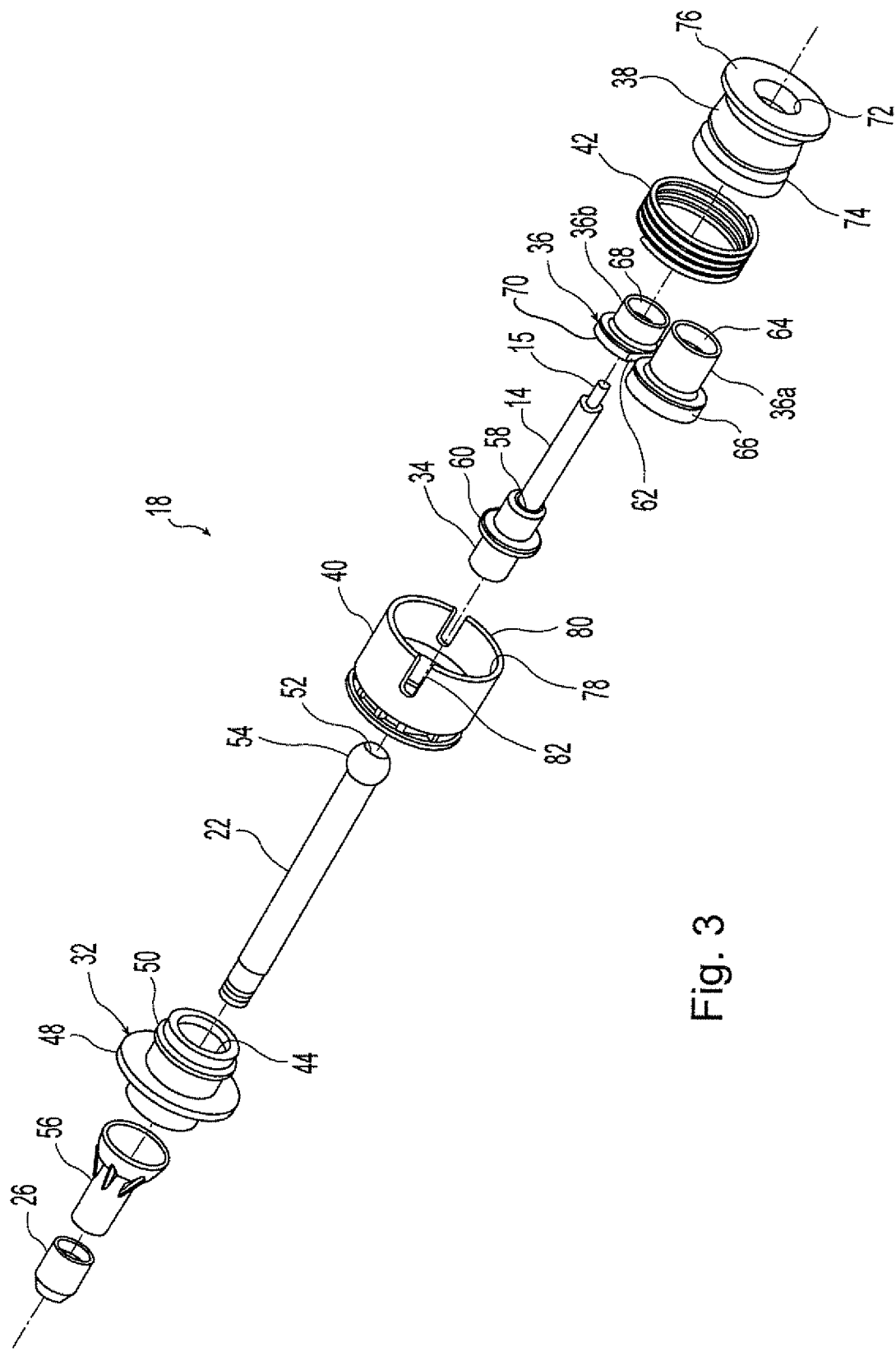
FIG. 3 is an exploded perspective view of the end fitting of FIGS. 1 and 2.
Figure 4:
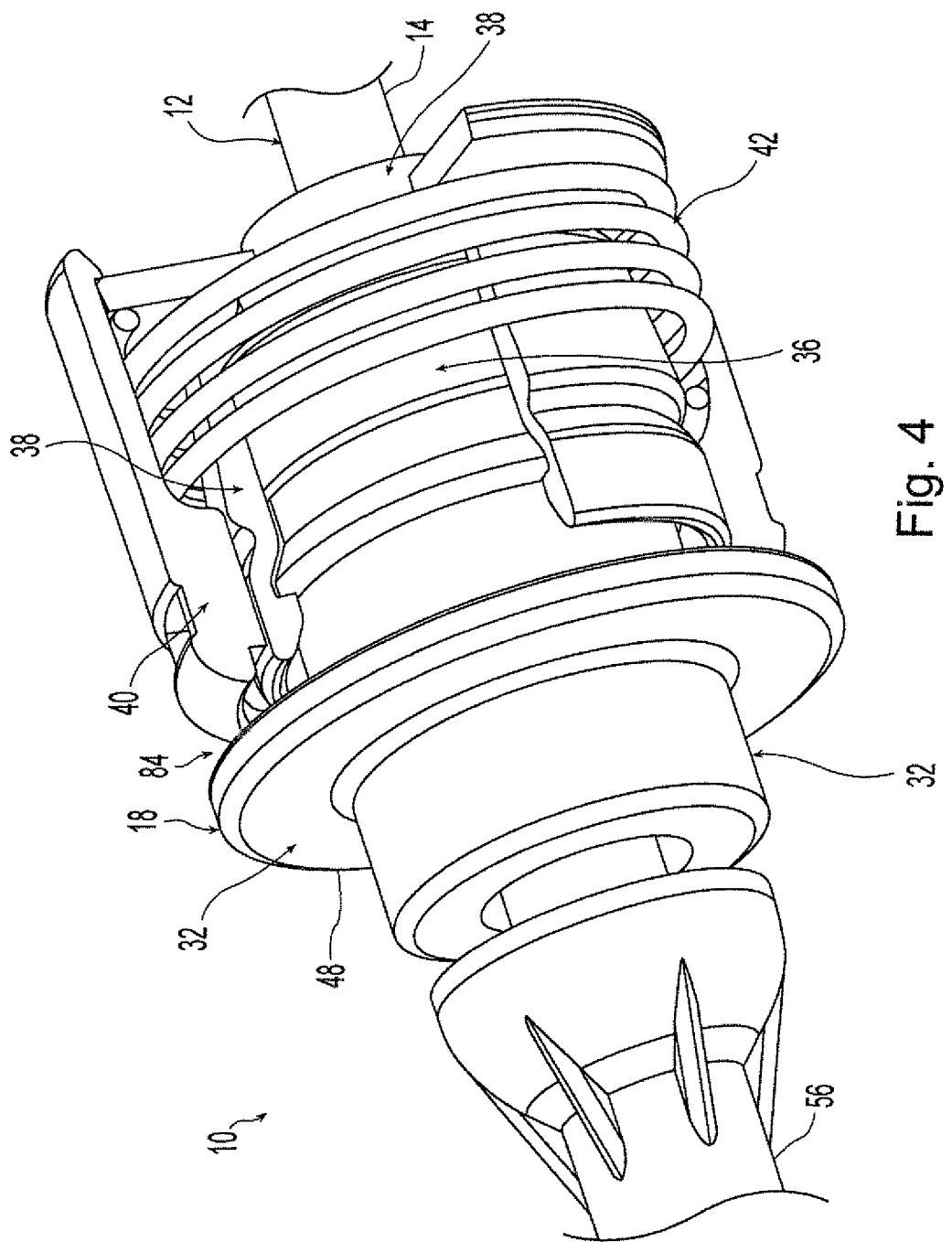
FIG. 4 is an enlarged, fragmented perspective view, partially in cross-section, of the end fitting of FIGS. 1 to 3.

Referring now to the drawings, FIGS. 1 and 2 show a cable assembly 10 which connects a remote control cable 12 to a transmission and shifter assembly of a motor vehicle, such as an automobile. While the illustrated embodiments of the present invention are particularly adapted for use with an automobile, it is noted that the present invention can be utilized with any motor vehicle having a control cable including trucks, buses, vans, recreational vehicles, earth moving equipment and the like, off road vehicles such as dune buggies and the like, air borne vehicles, and water borne vehicles. While the illustrated embodiments of the present invention are particularly adapted for use with a transmission system, it is also noted that the present invention can be utilized with other motor vehicle systems such as, for example, a parking brake, accelerator, hood release, brake release, trunk release, park lock, tilt wheel control, fuel filler door, and/or hydraulic control cables.

As shown in FIG. 19, the illustrated push/pull cable 12 includes a flexible outer sheath or conduit 14 and a flexible inner core or strand 16 longitudinally slidable within the conduit 14. In automotive applications, the conduit 14 typically includes an interior thermoplastic tube or liner 14a. The liner 14a forms the inside diameter or passage 14b of the conduit 14. Exterior to the liner 14a, a reinforcing element 14c, such as a plurality of metal wires helically wrapped about the liner 14a, is provided to add strength to the thermoplastic liner 14a. The reinforcing element 14c gives added strength for the compression and tension loads seen in push-pull applications. For push-pull applications such as the illustrated automatic transmission system, the reinforcing element 14c is a spaced-wire system including twelve wires or wire bundles spaced apart to form gaps therebetween. It is noted that other suitable quantities of wires or wire bundles can alternatively be utilized depending on the specific application. For example, push-pull applications such as manual transmissions or transfer-cases often utilize additional wires to obtain a full-wire system wherein the wires or wire bundles fully surround the liner 14a with no gaps therebetween. Also for example, pull-only applications such as a hood release often utilize fewer wires such as three wires. After the reinforcing element 14c is applied about the liner 14a, an outer coating or jacket 14d of flexible thermoplastic material is applied to hold the reinforcement member 14c in relation to the liner 14a and fully encapsulate the sub-assembly. The outer coating 14d is typically applied through a high temperature extrusion process. Through extrusion, an outside diameter is formed around the sub-assembly and the conduit 14 can be cut to a desired length. It is noted that the conduit 14 can alternatively utilize any other suitable materials and/or can alternatively have any other suitable construction within the scope of the present invention.

The core 16 typically consists of a strand assembly made up of metal wires. The metal wires are wound in different configurations depending upon the application. The core 16 is used for push-pull loading and typically has a center wire or wire bundle 16a. To strengthen the center wire 16a, a reinforcing element 16b is provided such as, for example, a plurality of outer wires or wire bundles, helically wound around the center wire 16a. As with the reinforcing element 14c for the conduit liner 14a, the reinforcing element 16b for the core 16 provides support for the center wire 16a. The illustrated reinforcing element 16b is a full-wire system including six wires or wire bundles that fully surround the center wire 16a with no gaps therebetween. It is noted that other suitable quantities of wires or wire bundles can alternatively be utilized. It is also noted that a spaced-wire system can be alternatively utilized wherein the wires or wire bundles are spaced apart to form gaps therebetween. It is noted that the core 16 can alternatively utilize any other suitable materials and/or can alternatively have any other suitable construction within the scope of the present invention.

As shown in FIGS. 1 and 2, a first end of the illustrated conduit 14 is secured to a quick disconnect coupler 18 in the form of a slide-collar end fitting assembly which is in turn secured to a fixed-position retention mount 20 such as a mounting bracket or other abutment member so the first end of conduit is maintained in a fixed position. A swivel tube member 22 extends from the forward end of the end fitting assembly 18. A first end of the core 16 extends longitudinally out of the first end of the conduit 14 and partially through the end fitting assembly 18 and is rigidly connected to a core attachment or rod member 24. The illustrated core 16 is crimped to the rod member 24 but can alternatively be secured in any other suitable manner. The rod member 24 is slidably received within the swivel tube member 22 for sliding longitudinal movement therein. The illustrated swivel tube member 22 is provided with a rubber seal 26 to minimize the entry of contaminants into the end of the swivel tube member 22.

The illustrated rod member 24 is operatively connected to an adjustable core terminal end 28 and a control member 30 such as the illustrated transmission selection lever. It is noted that the rod member 24 can alternatively be connected to the control member 30 in any other suitable manner.

The second end of the conduit 14 and the core 16 are operatively connected to an actuator such as a shifter assembly (FIG. 20) with a similar end fitting except that the rod member 24 is preferably provided with a terminal 25 (FIG. 13) for connection to the shifter assembly. The selected longitudinal movement of the core 16 pushes or pulls the rod member 24 to operate the control member 30 in a desired manner. The rod member 24 longitudinally moves within the swivel tube member 22 to define a line of force as the rod member 24 is actuated to axially move into and out of the swivel tube member 22. Thus, longitudinal movement of the core 16 and the rod member 24 actuates the control member 30. The flexible conduit and core 14, 16 allow the cable 12 to be routed along a desired path, which is typically not linear. The swivel tube member 22 pivots the orientation of the rod member 24 relative to the end fitting assembly 18 to account for the rotational motion of the control member 30. The adjustable core terminal end 28 allows the effective length of the cable 12 to be adjusted to account for any variances in length due to manufacturing tolerances and the like.

As best shown in FIGS. 3 to 6, the illustrated end fitting assembly 18 includes an end fitting or main body 32, the swivel tube member 22, a conduit sleeve 34, an isolator 36, a snap cap or retainer 38, a slide collar or slider 40, and a spring member 42.

The illustrated end fitting 32 is generally tubular-shaped having a generally cylindrical-shaped outer surface and a longitudinally extending central opening or passage 44. A forward portion of the passage 44 forms a forward portion of a spherical-shaped socket 46 for the swivel tube. A portion of the passage 44 between the socket 46 and the forward end of the end fitting 32 is generally frusto-conical shaped so that the swivel tube member 22 can pivot within the socket 46. The rearward portion of the passage 44 is sized and shaped to receive the conduit sleeve 34 and the isolator 36 therein as described in more detail hereinafter. The forward portion of the outer surface is provided with a radially extending flange 48. The illustrated flange 48 is located radially outward from the socket 46. The flange 48 forms a rearward-facing abutment for engagement with the mount 20 as described in more detail hereinafter. The rearward portion of the outer surface is provided with a radially extending protrusion 50. The protrusion 50 is sized and shaped for cooperation with the retainer 38 as described in more detail hereinafter.

The end fitting 32 is preferably of unitary construction and molded of a plastic material. It is noted that the end fitting 32 can alternatively be of integral construction and/or formed at least partially of any other suitable material.

The illustrated swivel tube member 22 is generally tubular-shaped having a generally cylindrical-shaped outer surface and a longitudinally extending central opening or passage 52. The passage 52 is sized and shaped for close sliding receipt of the rod member 24 therein. The rearward end of the passage 52 is expanded to eliminate sharp edges which may abrade the core 16 which passes into the swivel tube member 22. The rearward end of the swivel tube member 22 is provided with a generally spherical-shaped ball portion 54. The ball portion 54 is sized and shaped for receipt within the socket 46 to form a ball and socket type swivel joint. The illustrated swivel tube member 22 is a drop-in swivel tube. That is, the entire swivel tube member 22 is passed through the passage 44 of the end fitting 32 in the forward direction until the ball portion 54 engages the portion of the socket 46 formed by the end fitting 32 and then is retained therein by securing the retainer 38. Therefore, neither the ball portion 54 nor the socket 46 must be deformed during installation. Thus, the ball portion 54 and socket 46 can be sized and shaped to provide a relatively high pull out load. A shield 56 is provided on the illustrated swivel tube member 22 to prevent debris such as rocks from entering the ball and socket joint.

The swivel tube member 22 is preferably of unitary construction and molded of a plastic material. It is noted that the swivel tube member 22 can alternatively be of integral construction and/or formed at least partially of any other suitable material.

The illustrated conduit sleeve 34 is generally tubular-shaped having a generally cylindrical-shaped outer surface and a longitudinally extending central opening or passage 58. The rearward portion of the passage 58 is sized and shaped for close receipt of the end of the conduit 14 therein to prevent relative movement therebetween. A rearward facing abutment within the passage 58 forms a seat for the conduit 14. The conduit sleeve 34 and the conduit 14 can be secured together in any suitable manner. The forward portion of the passage 58 is smaller than the rearward portion and is sized for passage of the core 16 therethrough. The forward end of the passage 58 is expanded to eliminate shape edges which may abrade the core 16 which passes out of the conduit sleeve 34 and into the swivel tube member 22. The outer surface of the conduit sleeve 34 is provided with a radially extending flange 60. The illustrated flange 60 is centrally located along the length of the conduit sleeve 34 and is sized and shaped to cooperate with the isolator 36 and the retainer 38 to secure the conduit sleeve 34 to the end fitting 32 as described in more detail hereinafter.

The conduit sleeve 34 is preferably of unitary construction and molded of a plastic material. The illustrated conduit sleeve 34 is over-molded onto the end of the conduit 14. It is noted that the conduit sleeve 34 can alternatively be of integral construction and/or formed at least partially of any other suitable material and/or can be secured to the conduit 14 in any other suitable manner.

The illustrated isolator 36 has first and second portions 36a, 36b that are joined together by a hinge portion 62. It is noted that alternatively the isolator 36 can alternatively be formed of separate components. The first or forward portion 36a of the isolator 36 is generally tubular-shaped having a generally cylindrical-shaped outer surface and a longitudinally extending central opening or passage 64. The outer surface is sized and shaped for close receipt into the passage 44 of the end fitting 32 and has a flange 66 at the rearward end which engages the rear end of the end fitting 32. The forward end of the passage 64 is sized and shaped to form a rearward portion of the socket 46. The rearward end of the passage 64 is sized and shaped for close receipt of the forward end of the conduit sleeve 34 therein. A rearward facing abutment within the passage 64 forms a seat for the conduit sleeve 34. The second or rearward portion 36b of the isolator 36 is also generally tubular-shaped having a generally cylindrical-shaped outer surface and a longitudinally extending central opening or passage 68. The outer surface is sized and shaped for close receipt within the retainer 38 and has a flange 70 at the forward end which is engaged by the retainer 38. The passage 68 is sized and shaped for close receipt of the rearward end of the conduit sleeve 34 therein. The flanges 66, 70 of the first and second portions 36a, 36b of the isolator 36 are formed to provide a seat for the flange 60 of the conduit sleeve 34 therebetween. It is noted that the illustrated isolator 36 extends entirely about the conduit sleeve 34 such that the only components that directly contact the conduit sleeve 34 are the isolator 36 and the cable 12. Specifically, the end fitting 32, the swivel tube member 22 and other components of the end fitting 18 are separated from the conduit sleeve 34 by the isolator 36.

The isolator 36 is preferably of unitary construction and molded of a suitable vibration damping material such as an elastic polymer, rubber or the like. It is noted that the isolator 36 can alternatively be of integral construction and/or formed at least partially of any other suitable material.

The illustrated snap cap or retainer 38 is generally tubular-shaped having a generally cylindrical-shaped outer surface and a longitudinally extending central opening or passage 72 therethrough. The forward portion of the passage 72 is sized and shaped for close receipt of the end fitting 32 and the isolator flanges 66, 70 therein. The rearward portion of the passage 72 is sized and shaped for close receipt of the rearward portion 36b of the isolator 36 therein. The rearward portion of the passage 72 is smaller than the forward portion of the passage 72 to form a forward facing abutment which engages the flange 70 of the rear portion 36b of the isolator 36. The forward end of the passage 72 is provided with a groove 74 sized and shaped to cooperate with the protrusion 50 of the end fitting 32 to form a snap-lock connection between the retainer 38 and the end fitting 32. Secured together in this manner, the isolator 36 and the conduit sleeve 34 are clamped between the end fitting 32 and the retainer 38 and the swivel tube member 22 is retained within the socket 46. The rear end of the retainer 38 is provided with a radially outward extending flange 76 forming forward and rearward facing abutments.

The retainer 38 is preferably of unitary construction and molded of a plastic material. It is noted that the retainer 38 can alternatively be of integral construction and/or formed at least partially of any other suitable material.

The illustrated slide collar 40 is generally tubular-shaped having a generally cylindrical-shaped outer surface and a longitudinally extending central opening or passage 78 therethrough. The forward portion of the passage 78 is sized and shaped for close sliding receipt of the forward end of the retainer 38 therein. The rearward portion of the passage 78 is sized and shaped for close sliding receipt of the rear flange 76 of the retainer 38 therein. The rearward portion of the passage 78 is larger than the forward portion of the passage 78 to form a rearward facing abutment. The rear end of the slide collar 40 is provided with a radially inward extending flange 80 forming a forward facing abutment which engages the rear flange 76 of the retainer 38 to limit forward movement of the slide collar 40 relative to the retainer 38. The illustrated slide collar 40 is provided with a plurality of slots 82 spaced apart about the circumference of the rear end of the slide collar 40 to form a plurality of flexible leg sections. The flexible leg sections assist in the passage of the retainer 38 past the rear flange 80 of the slide collar 40 during assembly. It is noted the forward end of the retainer 38 provides a sliding support surface for the sliding collar 40. It is also noted that a groove 84 is formed for the mount 20 between the forward end of the slide collar 40 and the flange 48 of the end fitting 32.

The slide collar 40 is preferably of unitary construction and molded of a plastic material. It is noted that the slide collar 40 can alternatively be of integral construction and/or formed at least partially of any other suitable material.

The illustrated spring member 42 is a compression helical-coil spring encircling the retainer 38 within the slide collar 40 and acting between the abutment of the slide collar passage 78 and the rear flange 76 of the retainer 38. In a shipping condition, the spring member 42 resiliently biases the slide collar 40 into a full forward position wherein the rear flange 80 of the slide collar 40 engages the rear flange 76 of the retainer 38. It is noted that the spring member 42 can be other suitable types of springs within the scope of the present invention.

Figure 7:
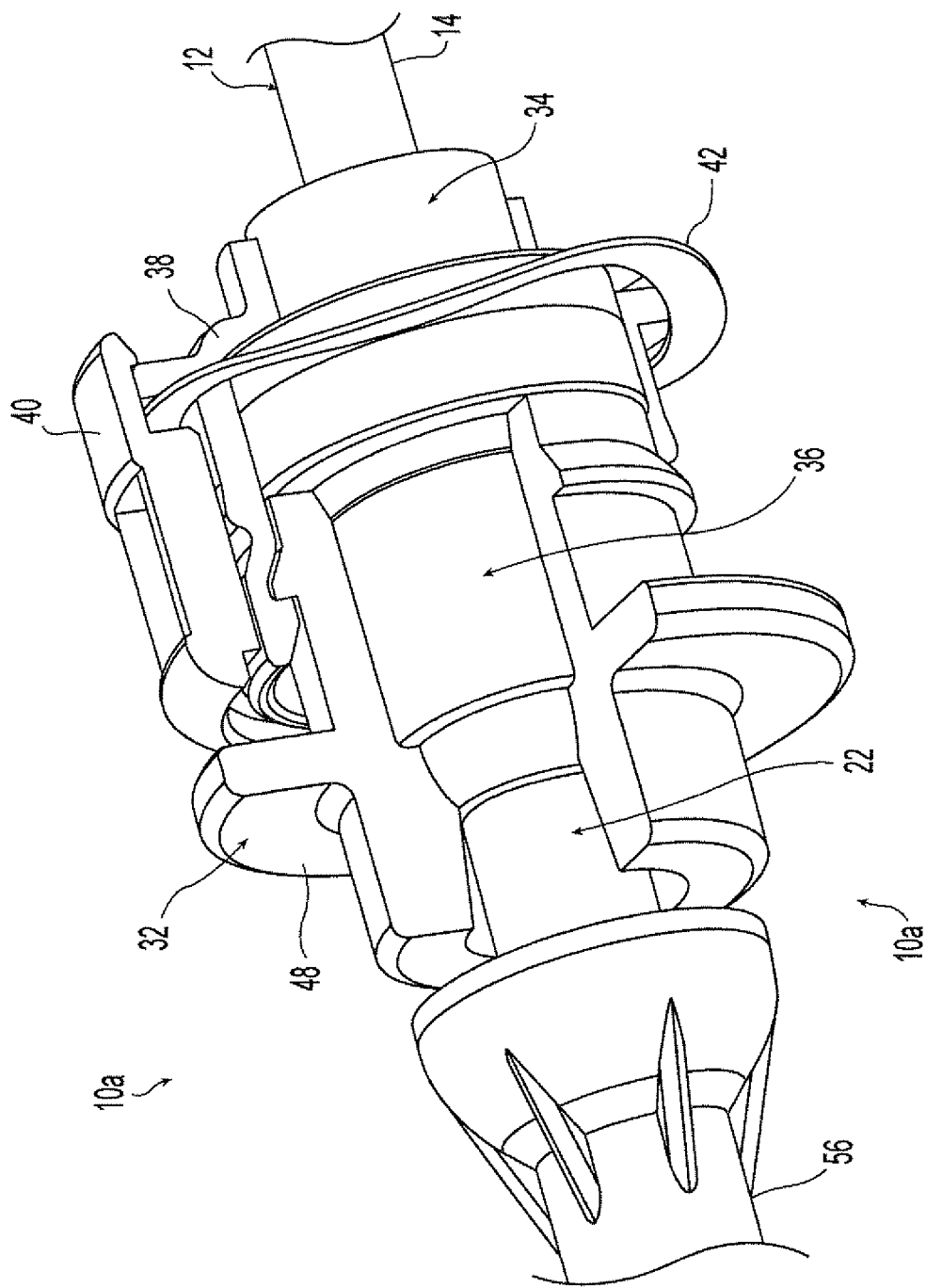
FIG. 7 is a fragmented perspective view, partially in cross-section, similar to FIG. 4 but showing an end fitting according to an alternative preferred embodiment of the present invention.

FIGS. 7 to 9 illustrate a cable assembly 10a according to a second embodiment of the present invention wherein like reference numbers are utilized to show like structure. The cable assembly 10a according to the second embodiment is substantially the same as the cable assembly 10 according to the first embodiment except that the spring member 42 is a wave spring. This embodiment illustrates that the spring member 42 can be any suitable type of spring.

Figure 10:
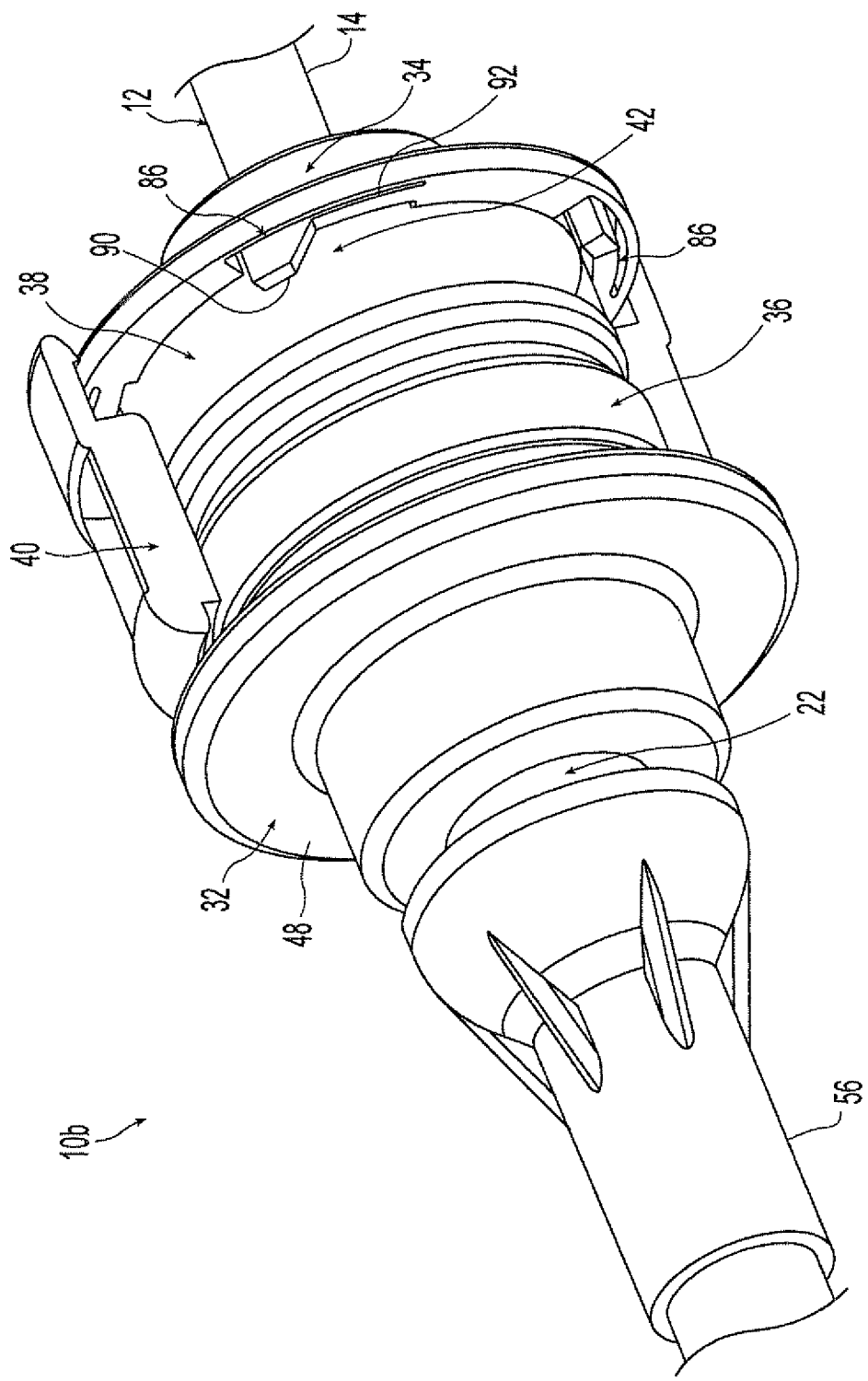
FIG. 10 is a fragmented perspective view, partially in cross-section, similar to FIGS. 4 and 7 but showing an end fitting according to another alternative preferred embodiment of the present invention.

FIGS. 10 to 12 illustrate a cable assembly 10b according to a third embodiment of the present invention wherein like reference numbers are utilized to show like structure. The cable assembly 10b according to the third embodiment is substantially the same as the cable assemblies 10, 10a according to the first and second embodiments except that the spring member 42 is a plurality of unitary prongs, that is, prongs molded as part of the retainer flange 76. It is noted that alternatively the prongs can be molded as part of the slide collar 40. This embodiment illustrates that the spring member 42 can be formed unitary with another component in order to reduce the total number of components. The illustrated retainer 38 is provided with four circumferentially spaced-apart prongs 86 but it is noted that any other suitable quantity of prongs 86 can alternatively be utilized. The illustrated prongs 86 each include a flexible leg portion 88 connected at one end and a forward facing protrusion 90 located at a free end of the leg portion 88. The illustrated leg portions 88 are arcuate. The protrusions 90 are sized and shaped to engage the abutment of the slide collar passage 78.

As best shown in FIG. 2, the illustrated retention mount 20 has a slot 92 sized and shaped to receive the end fitting 32 therein. The illustrated slot 92 has a semi-circular end sized for closely receiving the end fitting 32 adjacent the rear side of the flange 48, that is, at the groove 84 of the end fitting 18. The slot 92 has parallel sides extending from the semi-circular end to the top edge 94 of the mount 20 so the slot 92 opens at the top edge 94 of the mount 20. An "eyebrow" type protrusion 96 rearwardly extends from the mount 20 about the bottom end of the slot 92. The protrusion 96 is sized and shaped to be received within the slide collar 40. The mount 20 forms a part of a support structure to support the cable 12 at a desired location. The mount 20 may be a mounting bracket, an arm of a support structure, part of a bulkhead or panel through which the cable 12 extends, or any other suitable abutment member.

When it is desired to attach the cable 12 to the mount 20, the slide collar 40 is pulled rearwardly against the bias of the spring member 42 and the groove 84 of the end fitting 18 is inserted into the slot 92 of the mount 20. It is noted that the orientation of the end fitting 18 does not matter when it is inserted into the slot 92, that is, the connection is positionally insensitive. Once the end fitting 18 is fully within the slot 92, the slide collar 40 is released so that the spring member 42 resiliently moves the slide collar 40 forward until the forward end of the slide collar 40 engages the mount 20 with the protrusion 96 of the mount 20 within the slide collar 40 to form an interlock in the vertical direction which resists the removal of the end fitting 18 from the mount 20.

FIGS. 13 to 17 illustrate a cable assembly 10c according to a fourth embodiment of the present invention wherein like reference numbers are utilized to show like structure. The cable assembly 10c according to the fourth embodiment is substantially the same as the cable assemblies 10, 10a, 10b according to the first to third embodiments except that the retention mount 20a is provided with a recess 98 rather than the protrusion 96 to form the interlock with the slide collar 40 to resist removal of the end fitting 18 from the slot 92. The mount 20a may be a mounting bracket, an arm of a support structure, part of a bulkhead or panel through which the cable 12 extends, or any other suitable abutment member.

The illustrated retention mount 20a again has a slot 92 sized and shaped to receive the end fitting 32 therein. The illustrated slot 92 again has a semi-circular end sized for closely receiving the end fitting 32 adjacent the rear side of the flange 48, that is, at the groove 84 of the end fitting 18. The slot 92 has parallel sides extending from the semicircular end to the top edge 94 of the mount 20 so the slot 92 opens at the top edge 94 of the mount 20a. The rearward facing recess 98 is on a rear side 97 of the mount 20a, has an outer edge 99, and extends about at least a portion of the slot 92. The recess 98 is sized and shaped to receive the forward end of the slide collar 40 therein. The illustrated recess 98 is circular shaped to receive the cylindrical shaped slide collar 40 and is coaxial with the semi-circular lower end of the slot 92. The illustrated recess 98 has a diameter greater than the semi-circular lower end of the slot 92 and the upper end of the recess 98 intersects the sides of the slot 92 below the upper edge 94 of the mount 20a. It is noted that the recess 98 can alternatively have any other suitable size and shape for receiving at least a portion of the forward end of the slide collar 40 to form an interlock to resist removal of the end fitting 18 from the slot 92. The illustrated mount 20a has a raised front section 100 on a front side 101 of the mount 20a at the recess 98 so that the wall at the recess 98 has a desired thickness to obtain a desired gap. It is noted that the raised front section 100 is optional. It is also noted that the mount 20a with the recess 98 can be utilized with the above-described end fitting 18 or alternatively any other suitable end fitting.

The mount 20a is preferably of unitary construction and molded of a plastic material. It is noted that the mount 20a can alternatively be of integral construction and/or formed at least partially of any other suitable material.

Figure 18:
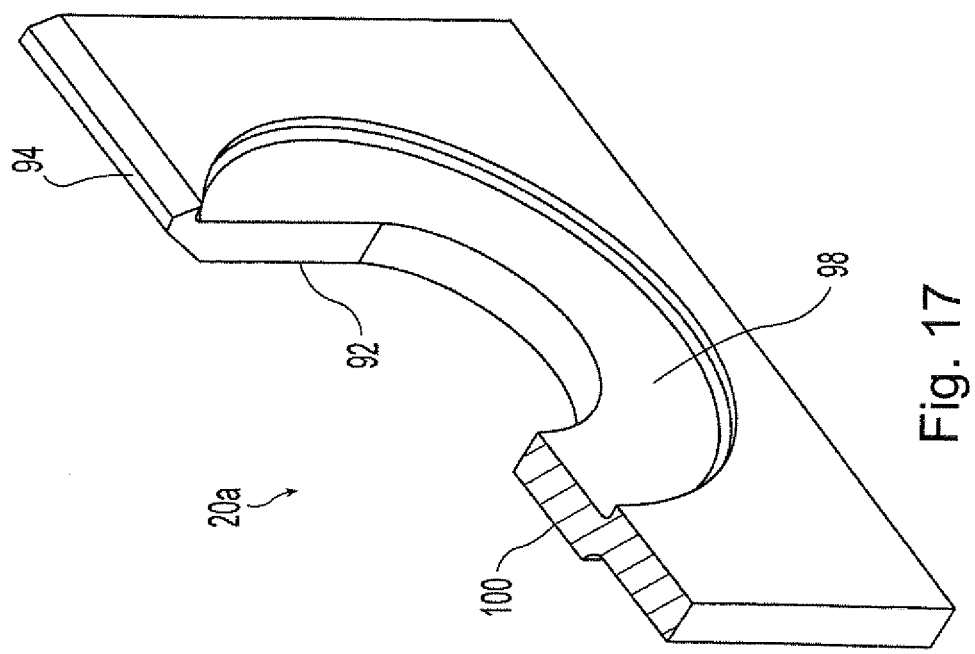
FIG. 18 is a rear perspective view partially in cross-section, similar to FIG. 17, of a retention mount according an alternative preferred embodiment of the present invention.

FIG. 18 illustrates a variation of the mount 20b wherein the raised front section 100 at the forward side of the recess 98 has been eliminated. Thus, the wall is thinner at the recess 98 than outside the recess. This variation of the mount 20b can advantageously be formed by stamping a metal material.

When it is desired to attach the cable assembly 10 to the mount 20a, 20b, the slide collar 40 is pulled rearwardly against the bias of the spring member 42 and the groove 84 of the end fitting 18 is inserted into the slot 92 of the mount 20a, 20b. Once the end fitting 18 is fully within the slot 92, the slide collar 40 is released so that the spring member 42 resiliently moves the slide collar 40 forward until the forward end of the slide collar 40 engages the mount 20a, 20b within the recess 98 of the mount 20a, or 20b to form an interlock in the vertical direction which resists the removal of the end fitting from the mount 20a, 20b. In this position, the mount 20a, 2b encompasses an outer portion of the end fitting 18 to fix the location of the end fitting 18 and the conduit 14 secured thereto. It is noted that the wall thickness at the recess 98 determines the width of the gap or groove 84 at installation. It is also noted that end fitting can have any rotational orientation when the end fitting 18 is inserted into the slot 92, that is, the connection is positionally insensitive.

The end fitting assembly 18 preferably engages the retention mount 20a, 20b with an insertion force of 50 N or less. The end fitting assembly 18 is also preferably retained to the mount 20a, 20b with a pull-off force of 250 N or greater. Such requirements can be accomplished by modification of various elements, such as altering spring force, shape and/or fit of the end fitting assembly 18 and the shape of the retention mount 20a.

FIGS. 20 to 22, show a shifter assembly and shifter cable system 102 that includes a transmission shifter assembly 104, the cable assembly 10 comprising the conduit 14, the core 16 disposed in the conduit 14, and the quick connect coupler 18 connected to the conduit 14, and the retention mount 20a encompassing an outer portion of the quick connect coupler 18 when connected to fix the location of the conduit 14 relative to the shifter assembly 104 at a coupler/retention mount interface 106. It is noted that the coupler/retention mount interface 106 is insensitive to the rotational position of the quick connect coupler 18.

The illustrated transmission shifter assembly 104 includes a shifter lever 108 pivotably connected to a base or mounting bracket 110 so that the shift lever 108 is pivotable over a shift path 112 about a laterally extending a pivot axis 114. The illustrated retention mount 20a is as described hereinabove and forms a rear portion of the mounting bracket 110. The illustrated mount 20a is oriented to position the quick disconnect coupler 18 substantially perpendicular to the pivot axis 114. The shifter lever 108 is provided with a pin 116 sized and shaped to cooperate with the terminal 25 of the rod end 24 to form a pivotable connection therebetween.

To connect the cable assembly 10 to the shifter assembly 104, the terminal 25 is placed onto the pin 116 and the quick disconnect coupler 18 is secured to the mount 20a as described hereinabove. The quick connect coupler 18 preferably engages the retention mount 20a with an insertion force of 50 N or less. The quick connect coupler 18 is also preferably retained to the mount 20a with a pull-off force of 250 N or greater. Such requirements can be accomplished by modification of various elements, such as altering spring force, shape and/or fit of the quick connect coupler 18 and the shape of the retention mount 20a.

In operation, the vehicle operator selectively moves the shifter lever 108 along the shift path 112 to a desired gear position which pulls or pushes the rod end 24. It is noted that the swivel tube member 22 pivots the orientation of the rod member 24 relative to the quick disconnect coupler 18 to account for the rotational motion of the pin 116 as the shifter lever 108 rotates about the pivot axis 114. The movement of the rod end 24 pulls or pushes the core 16 within the conduit 14. The movement of the core 16 pulls or pushes the rod end 24 at the other end of the core 16 which pulls or pushes the terminal end 28 to move the selection lever 30 of the transmission (FIG. 1).

It is apparent from the foregoing disclosure that assembly of the end fitting 18 is simplified and the pull out load of the swivel tube member 22 is increased by the use of a drop-in swivel tube member 22. Additionally, vibration damping is improved by the use of an internal isolator 36 that fully isolates the conduit 14. Furthermore, assembly of the end fitting 18 is simplified by providing a retainer 38 that retains the conduit sleeve 34 and the swivel tube member 22 while providing a sliding support for the slide collar 40 and an abutment for the spring member 42. Moreover, the mount 20a, 20b provides easy installation under low insertion loads, maintains retention requirements and positional insensitivity, and provides relatively low manufacturing costs.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A motion transmitting cable assembly comprising, in combination:
   a cable having a conduit and a core movable within the conduit;
   a mount comprising:
      a plate having front and rear sides and an edge connecting the front and rear sides;
      a slot formed through the plate from the front side to the rear side and extending from the edge of the plate; and
      a rearward-facing recess formed in the rear side of the plate and having an outer edge extending at least partially around the slot;
      wherein the recess extends from the outer edge of the recess to the slot along the entire length of the outer edge of the recess;
      a raised section formed on the front side of the plate opposite the recess; and an end fitting comprising:
      a flange;
      a slide collar movable toward and away from the flange; and
      a spring member biasing the slide collar toward the flange;
   wherein the end fitting extends through the slot with the flange and the slide collar on opposed sides; and
   wherein the spring member biases the slide collar into the recess with the slide collar engaging the rear side of the plate at the recess and the flange engaging the front side of the plate at the raised section to form an interlock between the slide collar of the end fitting and outer edge of the recess of the mount that resists removal of the end fitting from the slot.

2. The motion transmitting cable assembly according to claim 1, wherein the slot has a semi-circular end and parallel sides extending from the semi-circular end to the edge.

3. The motion transmitting cable assembly according to claim 2, wherein the slide collar is generally cylindrically shaped, and the recess is circular shaped and coaxial with the semicircular end.

4. The motion transmitting cable assembly according to claim 3, wherein the recess does not extend to the edge and intersects sides of the slot.

5. The motion transmitting cable assembly according to claim 1, wherein the slide collar is generally cylindrically shaped and the recess is circular shaped.

6. The motion transmitting cable assembly according to claim 5, wherein the recess does not extend to the edge and intersects sides of the slot.

7. The motion transmitting cable assembly according to claim 1, wherein the conduit is reinforced with at least twelve spaced-apart wires.

8. The motion transmitting cable assembly according to claim 1, wherein the slide collar is generally cylindrically shaped, and the outer edge of the recess is circular shaped.

9. The motion transmitting cable assembly according to claim 8, wherein the slot has a semi-circular end and parallel sides extending from the semi-circular end to the edge of the plate.

10. The motion transmitting cable assembly according to claim 9, wherein the circular shaped outer edge of the recess is coaxial with the semicircular end of the slot.

11. The motion transmitting cable assembly according to claim 9, wherein the outer edge of the recess does not extend to the edge of the plate and intersects the sides of the slot.

12. The motion transmitting cable assembly according to claim 1, wherein the outer edge of the recess does not extend to the edge of the plate and intersects sides of the slot.

13. The motion transmitting cable assembly according to claim 1, wherein the raised section and the recess cooperate to form a predetermined gap between the flange and the slide collar while the end fitting is secured to the mount with the slide collar engaging the rear side of the plate at the recess and the flange engaging the front side of the plate at the raised section.

14. The motion transmitting cable assembly according to claim 1, wherein the raised section is circular shaped.

15. The motion transmitting cable assembly according to claim 14, wherein the slide collar is generally cylindrically shaped, and the outer edge of the recess is circular shaped.

16. The motion transmitting cable assembly according to claim 1, wherein the raised section is located opposite the entire recess.

* * * * *